United States Patent [19]

Mead et al.

[11] 4,385,439
[45] May 31, 1983

[54] METHOD OF MAKING A LITHIUM-IODINE CELL

[75] Inventors: Ralph T. Mead, Kenmore; Frank W. Rudolph, Depew; Norbert W. Frenz, Jr., North Tonawanda; Wilson Greatbatch, Clarence, all of N.Y.

[73] Assignee: Wilson Greatbatch, Ltd., Clarence, N.Y.

[21] Appl. No.: 161,058

[22] Filed: Jun. 19, 1980

Related U.S. Application Data

[60] Continuation of Ser. No. 965,254, Dec. 1, 1978, abandoned, which is a division of Ser. No. 865,849, Dec. 30, 1977, Pat. No. 4,166,158.

[51] Int. Cl.³ .................................................. H01M 2/36
[52] U.S. Cl. .................................. 29/623.2; 29/623.1; 141/331
[58] Field of Search ............... 29/623.1, 623.2, 623.5, 29/730; 141/311 R, 392, 391, 331; 429/101, 199, 213, 181, 185

[56] References Cited

U.S. PATENT DOCUMENTS

| | | | |
|---|---|---|---|
| 1,286,830 | 12/1918 | Sturmer | 141/311 |
| 1,433,662 | 10/1922 | Small | 141/392 |
| 1,495,990 | 6/1924 | Olaneta | 29/623.1 |
| 2,607,968 | 8/1952 | Peterson | 141/311 |
| 2,791,148 | 5/1957 | Maisch | 141/331 |
| 3,723,183 | 3/1973 | Greatbatch | 429/199 |
| 3,817,791 | 6/1974 | Greatbatch et al. | 429/101 |
| 3,874,929 | 4/1975 | Greatbatch | 429/181 |
| 3,908,717 | 9/1975 | Rademacher et al. | 141/392 |
| 3,937,635 | 2/1976 | Mead et al. | 429/199 |
| 3,957,533 | 5/1976 | Mead et al. | 429/213 |
| 3,994,747 | 11/1976 | Greatbatch et al. | 429/199 |
| 3,996,066 | 12/1976 | Mead et al. | 429/213 |
| 4,094,224 | 6/1978 | Homko | 141/331 |
| 4,127,159 | 11/1978 | Chamdru et al. | 141/392 |

FOREIGN PATENT DOCUMENTS 540311  2/1977  U.S.S.R. .......................... 29/623.1

*Primary Examiner*—Daniel C. Crane
*Attorney, Agent, or Firm*—Christel, Bean & Linihan

[57] ABSTRACT

A lithium-iodine cell comprising a casing of electrically conducting material, an anode including a lithium element within the casing, an electrical conductor operatively connected to the lithium element and extending out from the casing, and a cathode comprising iodine-containing material in operative contact with both the casing and the lithium element. The anode electrical conductor is completely sealed from the rest of the cell, and the casing serves as the cathode current collector. The anode operative surface is provided with a coating of an organic electron donor material. The anode conductor is enclosed within the combination of an insulator element within the casing, an isolator element between the insulator and the conductor, and a ferrule having one end within the insulator and the other end extending from the casing. During assembly, the cathode material is introduced in heated form and a filling element is employed which serves to keep the edge of the casing open end clean to facilitate subsequent welding of a lid to the casing.

3 Claims, 5 Drawing Figures

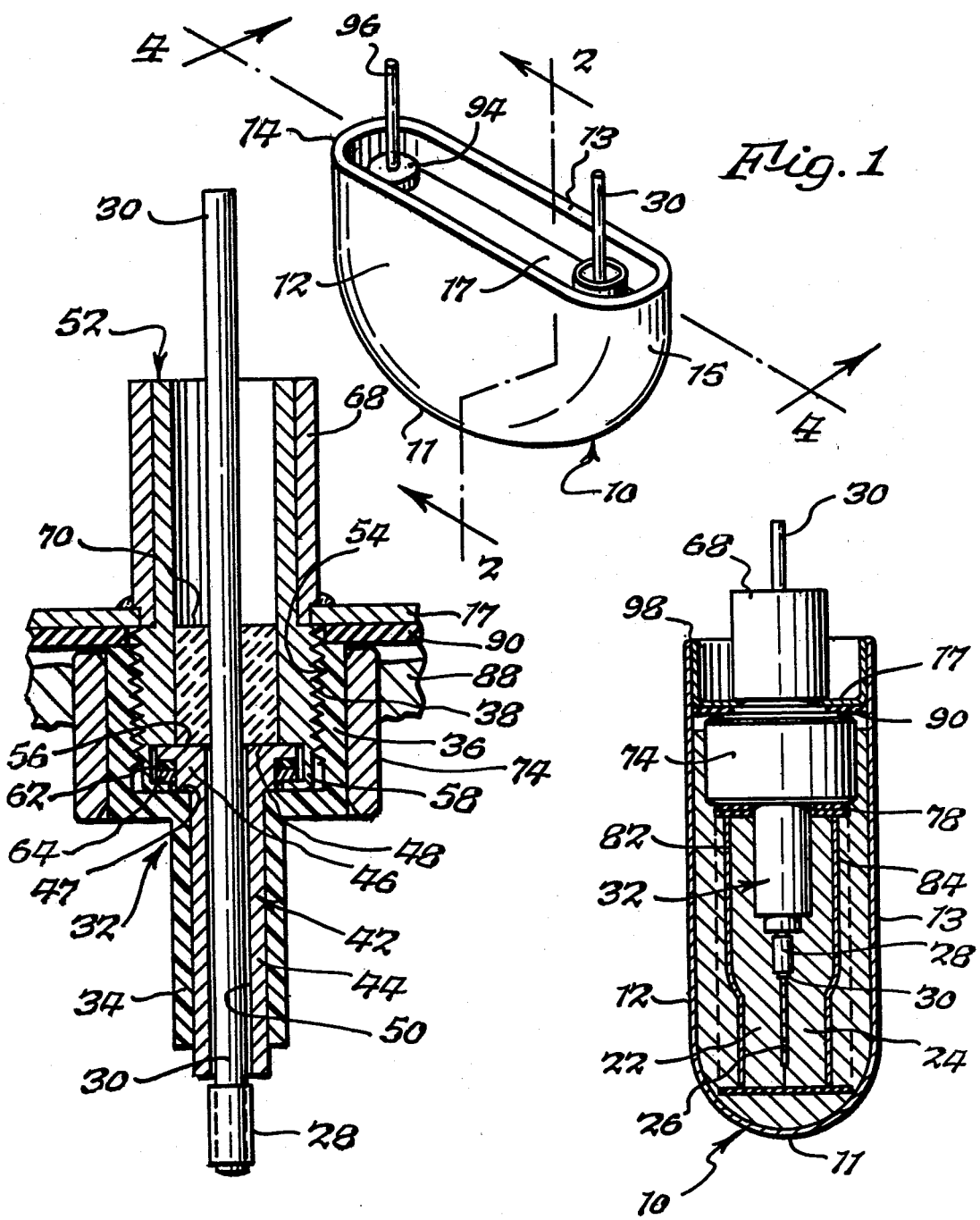

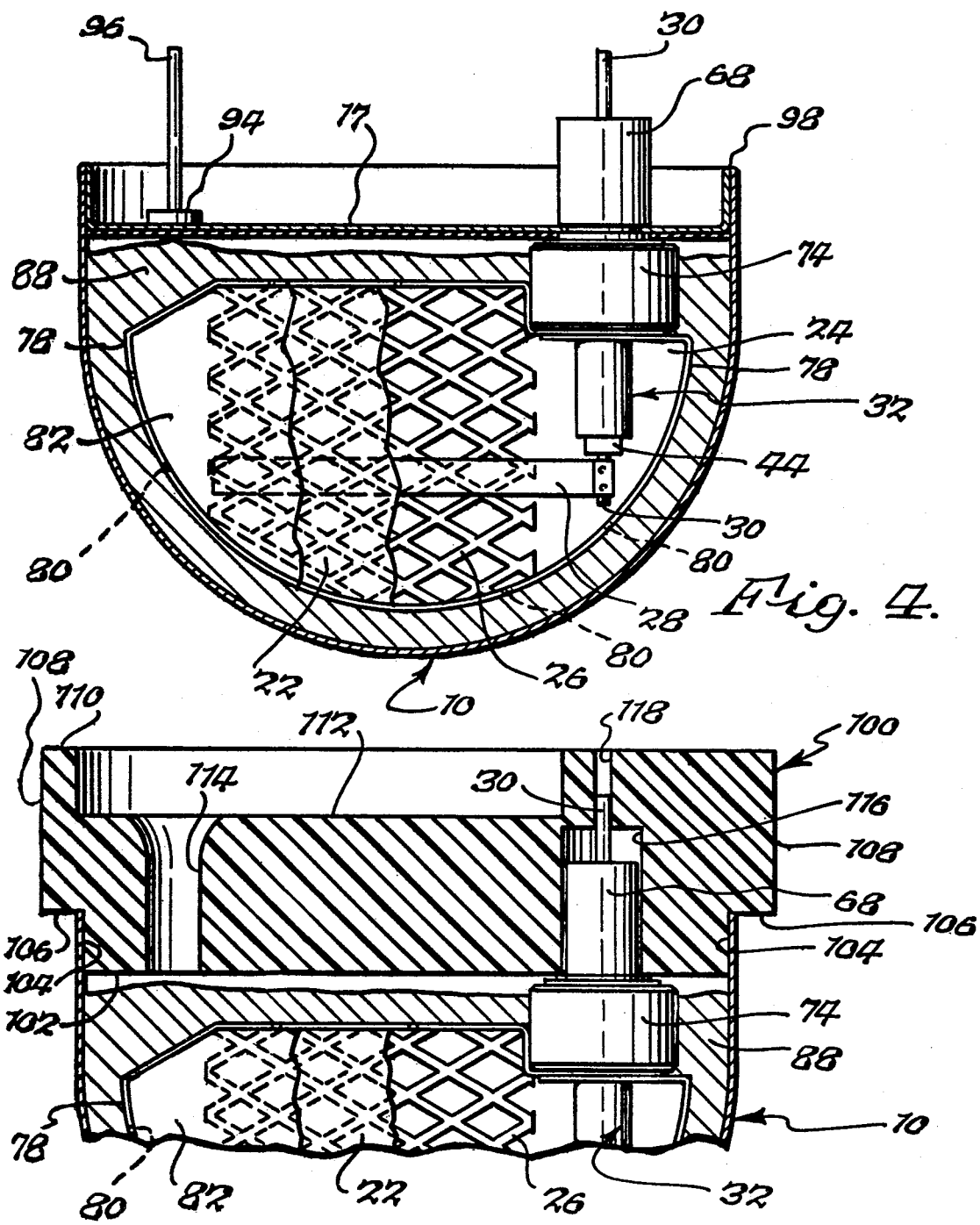

METHOD OF MAKING A LITHIUM-IODINE CELL

This is a continuation of application Ser. No. 965,254 filed Dec. 1, 1978, a division of application Ser. No. 865,849 filed Dec. 30, 1977 and now U.S. Pat. No. 4,166,158 issued Aug. 28, 1979.

BACKGROUND OF THE INVENTION

This invention relates to the conversion of chemical energy to electrical energy, and more particularly to a new and improved construction for lithium-iodine cells.

One area of use of the present invention is in providing electrical power to inaccessible devices in the human environment, for example to an implanted cardiac pacemaker, although the principles of the present invention can be variously applied. Lithium-iodine batteries are available for such use which advantageously have an open circuit voltage about twice that of the mercury cell, do not generate gas during operation, and have a non-corrosive electrolyte. The nature of the iodine-containing material such as an iodine complex is that it can tend to flow within the cell and possibly from a sheet circuit path between the anode collector lead and cathode. It is important to prevent such leakage, not only to maintain cell operation but also to prevent harm to a human body in which the cell may be implanted. It also is desirable to provide a cell having relatively high energy density.

SUMMARY OF THE INVENTION

It is, therefore, an object of this invention to provide a new and improved construction for a lithium-iodine cell.

It is a further object of this invention to provide such a cell having a relatively high energy density.

It is a further object of this invention to provide such a cell wherein the anode current collector is completely sealed or shielded from the iodine-containing cathode material and from the cell outer casing.

It is a further object of this invention to provide such a cell wherein the lithium area therein is relatively large and the overall cell size is relatively small.

It is a further object of this invention to provide such a cell which has relatively few parts and requires a relatively short time to assemble.

It is a further object of this inventon to provide a new and improved anode assembly for a lithium-iodine cell.

It is a further object of this invention to provide a new and improved method of making a lithium-iodine cell.

The present invention provides a lithium-iodine cell comprising a casing of electrically conducting material, anode means including a lithium element within the casing, electrical conductor means operatively connected to the lithium element and extending out from the casing, and cathode means comprising iodine-containing material within the casing and contacting the lithium element. The casing serves as a cathode current collector, and the operative surface of the lithium anode element is provided with a coating of an organic electron donor material. The anode conductor means is completely sealed from the rest of the cell by means including an insulator element of material which is non-reactive with iodine surrounding the conductor within the casing, an isolator element of material which is non-reactive with iodine between the insulator element and the conductor and a ferrule element enclosing the conductor having a portion within the casing and a portion extending from the casing. The cathode material comprises a charge transfer complex of an organic electron donor material and iodine. During assembly the material is introduced in heated form to the casing by means of a filling element which keeps the edge of the casing open end clean to facilitate subsequent welding of a lid to the casing.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1 is a perspective view of a lithium-iodine cell according to the present invention;

FIG. 2 is a sectional view taken about on line 2—2 in FIG. 1;

FIG. 3 is a fragmentary sectional view of a portion of the cell of FIG. 1;

FIG. 4 is a sectional view taken about on line 4—4 in FIG. 1; and

FIG. 5 is a fragmentary sectional view illustrating a cell filling technique.

DETAILED DESCRIPTION OF THE ILLUSTRATED EMBODIMENTS

Referring now to FIG. 1, a lithium-iodine cell according to the present invention comprises a casing 10 of metal such as stainless steel which preferably is shaped or otherwise formed to be hollow and generally rectangular in shape of an integral construction including a curved bottom portion 11, spaced-apart planar side wall portions 12, 13 extending from the bottom portion, and spaced-apart curved end wall portions 14, 15 also extending from bottom portion 11 and joining corresponding ones of the side wall portions 12, 13. The bottom portion 11 is of compound curvature in that it is curved both in a direction between the side wall portions 12, 13 and also is curved in a direction between the end wall portions 14, 15. The curvature of bottom portion 11 between side portions 12, 13 is of the same degree as the curvature of the end wall portions 14, 15 thereby defining a continuous, curved surface around along the casing. The side wall portions 12, 13 are generally parallel. Casing 10 has an opened top or end opposite the bottom portion 11 which is sealed closed by means of a lid 17 also of metal such as stainless steel after the cell has been assembled as will be described in detail presently.

Referring now to FIGS. 2-4, the cell of the present invention further includes anode means comprising a pair of lithium elements or plates 22, 24 having an anode current collector element 26 sandwiched or positioned therebetween. As shown in detail in FIG. 4, current collector 26 is relatively thin, preferably a sheet of no. 12 mesh-nickel. A conductor strip 28 of nickel or suitable metal is spot welded to collector element 26 along one edge thereof, and an electrical conductor 30 which preferably is a nickel-iron alloy is welded at one end to the strip 28 and is of sufficient length allowing it to extend out from casing 10 for making electrical connection thereto.

Conductor 30 is sealed from the remainder of the cell by means including an insulator element generally designated 32 which surrounds lead 30 and which has a first portion 34 which is sandwiched between the plates 22, 24 and a second body portion 36 which is of larger cross section, preferably cylindrical, and located between the lithium plates and lid 17 when the cell is completed. The interior of portion 36 is provided with threads 38 for a purpose to be described. The insulator 32 is of a material which in addition to being a non-conductor of electricity also is non-reactive with iodine, i.e. does not exhibit electronic conduction when exposed to iodine. One form of material found to perform satisfactorily is a fluoropolymer material commercially available under the name Halar, a trademark of the Allied Chemical Company. Of course, other materials having these characteristics can be used for the insulator 32.

The anode conductor sealing means further comprises an isolator element generally designated 42 located between insulator 32 and conductor 30. In particular, isolator 42 includes a first portion 44 having an outer dimension enabling it to fit relatively snugly within insulator portion 34 and a second portion 46, preferably generally cylindrical in shape, having an outer diameter less than the inner diameter of insulator portion 36 and an axial length considerably smaller than the axial length of insulator portion 36. One axial end face 47 of isolator portion 46 abuts against the inner end face of insulator portion 36, and this end face is of a diameter smaller than that of the opposite axial end face 48. The two axial end faces of isolator portion 46 are disposed in parallel planes and define two diametric sections of isolator portion 46 which meet at an intermediate annular surface disposed in a plane parallel to the end faces 47, 48. This, in turn, defines an annular recess or shoulder adjacent the axial end face 47 and adjacent the inner surface of insulator portion 36 against which the isolator portion 46 abuts. Isolator 42 has a longitudinal passage or bore 50 along the entire length of isolator 42 and of a cross-sectional dimension enabling it to receive anode conductor 30. The isolator element 42 is of a material which does not exhibit electronic conduction when exposed to iodine. One form of material found to perform satisfactorily is a fluoropolymer material commercially available under the name Tefzel, a Trademark of the Dupont Company.

The anode conductor sealing means further comprises a first or inner ferrule 52 of metal such as stainless steel which encloses a further portion of lead 30. Ferrule 52 is provided with threads 54 along the outer surface near one end thereof which is threaded into the insulator portion 36. Ferrule 52 is of generally hollow cylindrical shape with substantially constant outer diameter proceeding from one end toward threads 54, and ferrule 52 has a slightly larger outer diameter in the region of threads 54 thereby providing a slightly greater wall thickness along the portion containing threads 54. The inner diameter of ferrule 52 is substantially constant proceeding from the one end and continuing along within substantially the entire portion containing threads 54. At the opposite end of ferrule 52 there is formed an inner annular recess defining an annular surface 56 disposed in a plane generally perpendicular to the longitudinal axis of the ferrule and also defining a relatively thin-walled annular rim of flange 58. Prior to assembly of the parts as illustrated in FIG. 2, rim 58 is disposed entirely concentric with respect to the longitudinal axis of ferrule 52. Anode lead 30 extends through ferrule 52 along the longitudinal axis thereof and spaced substantially equidistant from the inner surface of ferrule 52.

As shown in FIG. 3, portion 46 of isolator element 42 is received within annular rim 58 of ferrule 52, and isolator end face 48 abuts the annular surface 56 of ferrule 52. The outer diameter of insulator portion 46 adjacent end face 48 is less than the inner diameter of the ferrule rim 58 thereby defining an annular clearance space. The combination of a sealing ring 62 and protective ring 64 is carried in the outer annular recess of isolator portion 46. In particular, ring 62 is positioned against the intermediate annular surface of isolator portion 46. Ring 62 is of rubber, Silastic or similar sealing material, has an inner diameter substantially equal to the diameter of the smaller section of isolator portion 46, and has an initial outer diameter substantially equal to the diameter of the larger section of isolator portion 46. Protective ring 64 is a metal washer, preferably of stainless steel, and is positioned against the exposed face of sealing gasket 62. Washer 64 preferably is of the same size as gasket 62. The combined axial length of gasket 62 and washer 64 is such as to leave an axial space between the exposed face of washer 64 and the plane of end face 47 which space has a thickness substantially equal to the wall thickness of the ferrule rim 58, the outer end portion of which is crimped or bent radially inwardly into contact with washer 64 in a manner which will be described in detail presently.

A second ferrule 68 of metal such as stainless steel surrounds the unthreaded or upper portion of ferrule 52 as viewed in FIG. 3 in concentric relation. The inner cylindrical surface of ferrule 68 contacts the outer cylindrical surface of ferrule 52, and ferrule 68 is secured such as by welding to lid 17 around an opening provided therein. A cylindrical seal element 70 of glass having an axial bore to receive conductor 30 is fitted within ferrule 52 at the end contacting isolator element 44. Seal 70 contacts axial end face 48 of isolator portion 46 and extends along ferrule 52 within the portion containing threads 54.

A holding means in the form of an annular ring or band 74 of metal such as stainless steel embraces portion 36 of insulator 32. In particular, band 74 has a wall thickness approximately equal to that of insulator portion 36, has an axial length substantially equal to that of insulator portion 36, and has an inner diameter substantially equal to the outer diameter of insulator portion 36. The band 74 contacts insulator portion 36 in firm, tight-fitting relation.

The anode assembly comprising the lithium elements 22, 24 and current collector 26 is fitted within an anode holding means or frame in the form of strap 78 which embraces the anode assembly in a manner exposing at least one lithium surface. Strap 78 is of the aforementioned Halar material or any similar material which is nonreactive with iodine. In the present illustration, strap 78 surrounds the peripheral edges of the lithium elements or plates 22, 24 in a snug, sealing relationship. The opposite ends of strap 78 are provided with apertures of a size sufficient to receive the insulator portion 34, and these ends are overlapped adjacent the juncture of insulator portions 34 and 36 as shown in FIG. 4. Strap 78 follows the contour or outline of the lithium elements 22, 24 which includes a curved bottom portion facing casing bottom 11, a right angle step portion against which insulator portion 36 rests, a flat top portion facing lid 17 and generally parallel thereto, and an inclined or angled portion joining the top and bottom portions.

One illustrative method of forming the anode assembly is as follows. First there is provided a subassembly including lead 30 within the combination of insulator 32, isolator 42 and ferrule 52. In particular, gasket 62 and washer 64 are fitted in place on portion 46 of isolator 42, and these parts are assembled to ferrule 52 with isolator portion 46 and the gasket 62 and washer 64 received within rim 58 and end face 48 contacting ferrule surface 56. The extending portion of rim 58 is crimped, bent or otherwise formed radially inwardly into firm contact against washer 64 as shown in FIG. 3. The force of rim 58 against washer 64 will cause gasket 62 to expand radially outwardly into the clearance space. Washer 64 protects isolator portion 46 and gasket 62 during the crimping of rim 58. Then the combination of isolator 42 and ferrule 52 is joined to insulator 32. In particular, insulator portion 32 is threaded onto the portion of ferrule 52 having threads 54, and isolator portion 44 is received in and along insulator portion 34. The parts can be joined further by means of a suitable cement which is non-reactive with iodine such as a cyanoacrylate cement commercially available under the name Permabond 101. The holding rim 74 can be fitted on insulator portion at this time or at a subsequent stage of the assembly operation.

Strap 78 is assembled into place with the ends overlapped to align the openings therein which then are fitted onto insulator portion 34 as shown in FIG. 4. The overlapping ends joined to insulator portion 34 can be sealed in place with the aforementioned Permabond 101 cyanoacrylate cement. Current collector 26, conducting strip 28 and the end of lead 30 are spot welded together whereupon the lithium plates 22, 24 are positioned within strap 78 on opposite sides of the collector element 26 and insulator portion 34. As shown in FIG. 4, the step or rectangular shoulder on the peripheral edge of the lithium plate combination abut against the lower surface and one side portion of insulator portion 36, strap 78 being therebetween. Strap 78 follows the contour of the lithium plate combination as shown in FIG. 4. The subassembly then is placed within two mold sections and is pressed together with a suitable force, for example about 3,000 lbs. The current collector 20, strip 28, insulator portion 34 and the portion of lead 30 contained therein are sealed within the lithium elements 22, 24. The inner surfaces of the two mold sections are shaped to define the curved outer anode surfaces as shown in FIG. 2. In particular, the oppositely directed lithium anode surfaces are curved or outwardly bulged in the region enclosing insulator portion 34. The remaining surface portions are generally planar and mutually generally parallel. The material of strap 78 is pressure bondable to lithium with the result that the peripheral juncture at the edges of the lithium elements 22, 24 is enclosed or sealed by the strap 78. In order to increase or enhance the adherence of strap 78 to the peripheral edge of the lithium plate combination, strap 78 is provided with openings designated 80 in FIG. 4. The openings or apertures 80 extend entirely through strap 78 and preferably are substantially circular in cross-section, although other suitable cross-sectional shapes can be employed. The dimension of each opening measured in the direction of the width of strap 78 is at least several times smaller than the strap width. A number of openings 80 are provided at spaced locations along the length of strap 78. During the pressure forming step in the fabrication of the anode, lithium from the peripheral edge regions of plates 22, 24 is forced or extruded into the openings 80 thereby strengthening the bond between the lithium elements and strap 78. The completed anode assembly thus has two exposed surfaces which are oppositely directed or disposed.

When the anode assembly is completed, the exposed surfaces of lithium element 22 and 24 are provided with coatings 82 and 84, respectively, of an organic electron donor component material and the nature of the coatings 82, 84 and their role in the cell of the present invention will be described in further detail presently. The completed anode assembly is positioned in casing 10 as shown in FIGS. 2 and 4, with the anode operative surfaces spaced from the inner surface of casing 10.

The cell of the present invention further comprises an iodine cathode including a region of cathode material 88 within casing 10 and operatively contacting the exposed surfaces of the lithium elements 22, 24 and operatively contacting the inner surface of casing 10. Casing 10, being of electrically conducting material, serves as a cathode current collector. According to a preferred mode of the present invention, the cathode material 88 comprises a charge transfer complex of an organic electron donor component material and iodine. The electron donor can be any organic compound having a double bond or an amine group. The electron donor functions to give the iodine sufficient conductivity for proper cell operation. A preferred form of the organic electron donor component is polyvinyl pyridine polymer and, in particular, two-vinyl-pyridine polymer.

The cell of the present invention further comprises an element 90 of mica or other suitable material positioned in casing 10 above cathode material 88. Element 90 is planar and relatively thin and is located in contact with the lower or inner surface of lid 17 and above cathode material 88 and disposed generally perpendicular to casing sidewalls 12, 13. Element 90 is of a peripheral outline or shape and size so as to fit snugly within casing 10 and can be cemented in place if desired. Element 90 serves as a heat shield to protect the remainder of the components within casing 10 from heat during welding of lid 17 into place. A terminal element comprising a base 94 and shaft or pin portion 96 is spot welded to lid 17. The element preferably is a nickel and serves an an electrical terminal inasmuch as the casing 10 serves as a cathode current collector. Lid member 17 is fitted into place in the open end of casing 10 and is welded at 93 around the peripheral edge thereof to the corresponding edge of casing 10.

The cell of the present invention can be fabricated in the following manner. An assembly of insulator 32, isolator 42, ferrule 52, band 74 and the associated components is formed in the manner described herein. This assembly and the anode assembly is combined by means of the pressure forming method previously described. The resulting combination in casing 10 with lead 30 disposed generally parallel to casing walls 12, 13 and with the outer ends of ferrule 52 and lead 30 located outwardly of the open end of casing 10. Casing 10 and the combination of parts therein is held upright with the open end facing upwardly by a holding fixture or other suitable means. Then cathode material is introduced to the casing 10 through the open end thereof. In particular, the cathode material or depolarizer is prepared by heating the organic material, i.e. 2-vinyl pyridine polymer, mixed with iodine, to a temperature greater than the crystallization temperature of iodine, for example about 300° F. The amount of iodine should be greater than about 50 percent by weight of the resulting mixture so that enough iodine is available in the cathode material to provide sufficient conductivity for proper cell operation. The dresulting mixture is a viscous, flowable substance which can be introduced to cell casing 10 in the following manner.

As shown in FIG. 5, a filling element generally designated 100 is placed in the open end of casing 10 in a manner covering the inner surface region of the casing around and adjacent the opening and isolating or protecting this surface from cathode material introduced to the casing through a passage in the element. In particular, element 100 comprises a solid body of material which is non-reactive with iodine, for example Teflon. While Teflon is preferred because it is easy to machine, other suitable materials can be employed. Element 100 is formed to include a planar end face 102 having a surface area and configuration substantially equal to the interior cross sectional shape and area within casing 10 adjacent the open end. End face 102 meets a first sidewall surface portion 104 extending continuously around the element and shaped and dimensioned to fit snugly within casing 10 adjacent the open end and in firm sealing-like contact with the casing inner wall surface adjacent the casing opening. Portion 104 meets a continuous ledge portion 106 disposed parallel to end face 102 which ledge is adapted to rest on the casing edge outlining the opening as shown in FIG. 5. Ledge 106 meets another sidewall surface portion 108 of perimeter greater than that of portion 104, and surface portion 108 meets another end face 110 of element 100 which is disposed substantially parallel to end face 102.

A recess 112 is provided in end face 110, and a filling passage 114 extends through body 100 from recess 112 through end face 102. A first bore or passage 116 extends into body 100 from end face 102 and is of a diameter and length adequate to accommodate the outwardly extending end of ferrule 52. A smaller diameter bore or passage 118 extends from passage 116 further through body 100 to accommodate the outwardly extending portion of lead 30. Element 100 is fitted into the open end of casing 10 as shown in FIG. 5 with ledge 108 resting on the casing edge and surface portion 104 firmly contacting the casing inner wall surface adjacent the casing opening. The distance between end face 102 and ledge 108 is such that when ledge 108 rests on the casing edge, end face 102 is spaced a short distance from the end of insulator portion 36 which faces element 100.

The heated cathode material is poured or otherwise introduced to recess 112 and then flows through passage 114 into the interior of casing 10. The amount of cathode material 88 introduced to casing 10 is sufficient to contact the exposed surfaces of the lithium elements 22, 24 and to reach a level at or closely adjacent the end face 102 of filling element 100. The inner casing surface of casing 10 contacted by surface 104 is kept clean and free of contamination by cathode material. When filling is completed, element 100 is removed from casing 10 and the welding shield element 90 is fitted in place. Then ferrule 68 and lid 17 are fitted in place, and the periphery of lid 17 is welded to casing 10 in the manner previously described. An effective weld results from the clean inner surface and edge of casing 10.

The lithium-iodine cell according to the present invention operates in the following manner. As soon as the iodine-containing cathode material, for example the cathode material 88 in FIG. 2-4, operatively contacts a lithium element, a solid lithium-iodine electrolyte begins to form at the interface. In the present illustration this occurs at the outer or oppositely disposed surfaces of the two lithium elements 22 and 24. An electrical potential difference will exist between the anode lead 30 and cathode terminal pin 96 because casing 10 is of electrically conductive material and operatively contacts the iodine-containing material to serve as a cathode current collector. The mechanism by which the foregoing is accomplished is believed to include migration of lithium ions through the electrolyte whereby lithium is the ionic species in the cell. The exact mechanism by which the iodine-containing cathode material 88 and lithium elements 22 and 24 come into operative contact through coatings 82 and 84, respectively, is not known. The mechanism could involve migration of iodine ions from material 88 through coatings 82, 84 to elements 22, 24 or migration of lithium ions from elements 22, 24 through coatings 82, 84 to material 88.

The material of coatings 82 and 84 on lithium elements 22 and 24, respectively, is an organic electron donor material of the group of organic compounds known as charge transfer complex donors. The material of the coatings can be the organic electron donor material used in preparing the charge transfer complex of the cathode material 88, but other materials can be employed. A preferred material for the coatings is polyvinyl pyridine and it is applied to the exposed surfaces of lithium elements 22 and 24 in the following manner. A solution of poly-2-vinyl pyridine polymer in anhydrous benzene or other suitable solvent is prepared. The poly-2-vinyl pyridine is readily commercially available. The solution is prepared with 2-vinyl pyridine present in the range from about 10 percent to about 20 percent by weight with a strength of about 14 percent by weight of 2-vinyl pyridine being preferred. While 2-vinyl pyridine, 4-vinyl pyridine and 3-ethyl 2-vinyl pyridine can be used, 2-vinyl pyridine is preferred because of its more fluid characteristics in solution. When the solution is prepared at a strength below about 10 percent the resulting coating can be undesirably too thin and when the solution is prepared at a strength greater than about 20 percent the material becomes difficult to apply. The solution is applied to the exposed surface of each lithium plate in a suitable manner, for example simply by application with a brush. The presence of the anhydrous benzene serves to exclude moisture thereby preventing any adverse reaction with the lithium plate. The coated anode then is exposed to a desiccant in a manner sufficient to remove the benzene from the coating. In particular the coated anode is placed in a chamber with barium oxide solid material for a time sufficient to remove the benzene, which can be in the neighborhood of 24 hours. The foregoing precedure can be repeated to provide multiple coatings or layers, for example three, on each lithium plate.

The coatings 82 and 84 on lithium elements 22 and 24, respectively, perform several important functions. One is a desirable reduction in cell impedance believed to result from a better and improved electrically effective contact area between the cathode material and each lithium element. In particular, when iodine-containing cathode material at an elevated temperature comes into contact with an uncoated lithium surface, there can be some immediate recrystallization of iodine on the lithium surface thereby blocking or preventing operative contact at that point between the lithium element and the complex of organic material and iodine. Coatings 82 and 84 serve as protective coatings to prevent this problem, functioning as buffers between the pure lithium plates and the relatively hot cathode material as it contacts the plates. There may be other mechanisms involved in the improvement of performance resulting from the use of this coating. As a result, there is provided a greater utilization of the surface of each anode element by the cathode material. In addition, the protective coatings 82, 84 permit a relatively longer handling time during construction of the cell prior to introducing the hot cathode material.

It is important that the iodine-containing material 88 is not allowed to come in contact directly with any portion of the electrical conducting means connected to the lithium members of the anode, in particular anode current collector 26 and lead 30. Otherwise, this will cause an electronic conduction between the cathode material 88 and the anode current collector 26 or lead 30 creating an electrical short circuit condition in the cell. In particular, any migration of the iodine-containing complex of material 88 directly to anode current collector 26 or directly to anode lead 30, instead of first reacting with a lithium member of the anode, will result in the condition of electronic conduction thereby creating an electrical short circuit condition in the cell. On the other hand, when the iodine-containing material 88 contacts only the lithium portion of the anode this gives rise first to a condition of ionic conduction and results in proper cell operation.

The cell construction according to the present invention advantageously prevents an electrical short circuit resulting from migration or flow of iodine-containing material 88. In particular, anode current collector 26, strip 28 and the connection to lead 30 are sealed within the sandwiched or pressure bonded assembly of lithium elements 22, 24. This seal is enhanced by the strap 78 which is of Halar or similar material which is non-reactive with iodine.

The foregoing arrangement together with insulator 32, isolator 42, ferrules 52, 68, seal 62 between isolator 42 and ferrule 52 and seal 70 between ferrule 52 and conductor 30 provides an anode structure which is completely sealed with the exception of the exposed lithium surface portions of the anode which are available to the cathode material 88. All parts of the anode current collector 26, strip 28 and electrical lead or conductor 30 connected thereto are shielded from the cathode material, and from the cell casing. Furthermore, the sealed assembly advantageously is completed before the entire cell is assembled, in particular before cathode material 88 is added thereto. Insulator 32 of Halar or similar material which is non-reactive with iodine surrounds and protects lead 30 between lid 17 and the current collector 26 within lithium elements 22, 24. Ferrule 52 surrounds and protects lead 30 from a point within lid 17 and within insulator portion 36 to a point outside casing 10. The threads 38, 54 provide film mechanical connection between insulator 32 and ferrule 52, and the threads also increase the path length for any leakage of cathode material 88 which might happen to occur between insulator 32 and ferrule 52.

Isolator element 42 provides another seal around cathode lead 30, in effect a double seal or redundant seal arrangement in co-operation with insulator 32. In partucular, any iodine-containing cathode material 88 which might happen to leak past threads 38 and 54 of insulator 32 and ferrule 52, respectively, is sealed from anode lead 30 by isolator portion 46 and by the entire length of isolator portion 44. The radial outward expansion of seal element 62 into the clearance space between isolator portion 46 and ferrule rim 58 provides an hermetic seal between isolator element 42 and ferrule 52. The glass element 70 provides a seal between isolator portion 46 and ferrule 52 and lead 30. The foregoing arrangement advantageously provides several seals between the anode conductor means and the remainder of the cell. The extrusion of lithium material from plates 22, 24 into the openings 80 in the sealing element or strap 78 increases the adherence or bonding between strap 78 and the periphery of the plates thereby enhancing the peripheral seal provided by strap 78. The insulator holding means or band 74 has sufficient hoop strength to prevent any radial outward expansion of insulator portion 36 which might occur, for example as a result of heat expansion of the parts during welding of lid 17 to casing 10 or as a result of iodine absorption by the material of insulator element 32. Thus band 74, by keeping insulator portion 36 in firm contact with ferrule 52, enhances the seal arrangement.

When the heated cathode material 88 is introduced to the interior of casing 10 by means of the filling element 100, the edge and inner wall surface of casing 10 adjacent and circumscribing the opening are kept clean, i.e. free of the cathode material, which improves the quality of the weld subsequently made between those surfaces of casing 10 and the lid 17. The filling element 100 also enables casing 10 to be filled with the heated, flowable cathode material in an even and uniform manner, with the lower end surface 102 serving to establish an upper or maximum limit or control on the level to which the casing is filled with the material 88. As shown in FIG. 5, cathode material 88 preferably is filled to a level slightly below the surface 102 of filling element 100. The angled or downwardly inclined corner portion of the anode assemble adjacent the outlet of the filling passage 114 provides adequate space to promote flow of cathode material from passage 114 into casing 10.

By having all parts of anode current collector 26, strip 28 and lead 30 shielded or sealed from cathode material 88 and from the metal casing 10, no insulation is needed between the cathode material and the metal casing. The casing can be completely filled with cathode material which more than doubles the iodine content of the cell as compared to cells requiring insulation. Another advantage of the cell of the present invention is that by virtue of the foregoing arrangement, the metal casing becomes a very large cathode current collector thereby improving cell performance due to the relatively larger amount of cathode material in contact with the current collector. The foregoing provides a cell having a high energy density and this desirable characteristic is enhanced by the coatings 82, 84 of organic electron donor material. By eliminating the need for insulation between cathode material 88 and metal casing 10, the cell of the present invention can be assembled relatively quickly and economically and requires relatively fewer parts.

It is therefore apparent that the present invention accomplishes its intended objects. While a single embodiment of the present invention has been described in detail, this is for the purpose of illustration, not limitation.

We claim:

1. A method of making a lithium-iodine cell comprising the steps of:
   (a) providing a casing of metal having an opening defined by a continuous and smooth wall inner surface portion terminating in an edge;
   (b) placing a lithium anode having an operative surface in said casing;
   (c) placing a one-piece filling element of a material non-reactive with iodine in said opening in a manner extending across said opening and closing said opening and sealingly contacting and covering said edge and sealingly contacting and covering a portion of said inner surface of said continuous wall portion adjacent said edge, said filling element having first and second passages therethrough, said first passage providing access into said casing, said first passage having a cross-sectional area considerably smaller than the cross-sectional area of said casing opening, said second passage sized for accommodating a part of said anode, said placing step further including inserting a part of said anode into said second passage;
   (d) introducing flowable cathode material comprising a charge transfer complex of an organic donor material and iodine by flowing said cathode material through said passage of said filling element in a manner such that said material is directed by said passage in a relatively narrow stream considerably smaller than the cross-sectional area of said casing as said material flows into said casing and into contact with said operative surface of said lithium anode;
   (e) said filling element preventing said cathode material from contacting said edge and said wall inner surface portion;
   (f) removing said filling element from said casing; and
   (g) sealing the opening in said casing by placing a metal lid in said opening and welding the periphery of said lid to said casing adjacent said casing edge and wall portion which were kept free of said cathode material by said filling element.

2. The method according to claim 1, wherein said flowable cathode material is poured through said passage of said filling element into said casing.

3. The method according to claim 2, wherein said flowable cathode material is poured into a recess in said filling element in communication with said passage allowing the poured cathode material to flow through said passage into said casing.

* * * * *